United States Patent
Delavaux

[11] Patent Number: 5,185,826
[45] Date of Patent: Feb. 9, 1993

[54] HYBRID PUMPING ARRANGEMENT FOR DOPED FIBER AMPLIFIERS

[75] Inventor: Jean-Marc P. Delavaux, Wescosville, Pa.

[73] Assignee: AT&T Bell Laboratories, Murray Hill, N.J.

[21] Appl. No.: 832,564

[22] Filed: Feb. 7, 1992

[51] Int. Cl.$^5$ .................. G02B 6/28; H01S 3/30; H04J 1/00
[52] U.S. Cl. .................. 385/24; 385/31; 385/42; 385/142; 372/6; 359/341; 359/345; 359/134
[58] Field of Search .................. 385/24, 31, 42, 123, 385/38, 48, 141, 142; 372/6, 69, 70; 359/115, 124, 127, 134, 160, 174, 333, 341, 345

[56] References Cited

U.S. PATENT DOCUMENTS

| | | | |
|---|---|---|---|
| 4,835,778 | 5/1989 | Kafka et al. | 372/6 |
| 4,859,016 | 8/1989 | Shaw et al. | 372/6 |
| 4,938,561 | 7/1990 | Grasso et al. | 372/6 |
| 4,959,837 | 9/1990 | Fevrier et al. | 372/6 |
| 4,963,832 | 10/1990 | Desurvire et al. | 330/4.3 |
| 4,996,587 | 4/1991 | Sasaki et al. | 350/96.15 |
| 5,035,481 | 7/1991 | Mollenauer | 385/24 |
| 5,039,199 | 8/1991 | Mollenauer et al. | 359/334 |
| 5,042,039 | 8/1991 | Edagawa et al. | 372/6 |
| 5,048,026 | 9/1991 | Shaw et al. | 372/6 |
| 5,050,949 | 9/1991 | DeGiovanni et al. | 359/341 |
| 5,058,974 | 10/1991 | Mollenauer | 385/27 |
| 5,064,263 | 11/1991 | Stein | 385/24 |
| 5,083,874 | 1/1992 | Aida et al. | 385/24 |
| 5,088,095 | 2/1992 | Zirngibl | 372/6 |
| 5,101,461 | 3/1992 | Nakajima | 385/38 |
| 5,111,334 | 5/1992 | Heidemann | 372/6 |

OTHER PUBLICATIONS

"High Gain Two-Stage Amplification with Erbium-Doped Fibre Amplifier", H. Masuda, et al., *Elec. Lett.*, vol. 26, No. 10, May 1990, pp. 661-662.

"Dynamic Gain Equalization in Two-Stage Fiber Amplifiers", C. R. Giles, et al., *IEEE Photonics Tech. Lett.*, vol. 2, No. 12, Dec. 1990, pp. 866-868.

*Primary Examiner*—Brian Healy
*Attorney, Agent, or Firm*—W. W. Koba

[57] ABSTRACT

A hybrid pumping scheme for rare-earth doped fiber amplifiers is disclosed. In particular, the arrangement utilizes at least two pump sources, operating at different wavelengths, coupled to a section of doped optical fiber, such as erbium-doped optical fiber. Optical multiplexers, such as fused fiber couplers, may be used to couple the message signal desired to be amplified, as well as the pump sources, to the doped fiber section. For certain embodiments, the doped fiber may be segmented into separate components, with the length of each component determined with respect to the wavelength of the associated pump signal.

11 Claims, 3 Drawing Sheets

HYBRID PUMPING ARRANGEMENT FOR DOPED FIBER AMPLIFIERS

BACKGROUND OF THE INVENTION

1. Technical Field

The present invention relates to doped fiber amplifiers for utilization in lightwave transmission systems and, more particularly, to pumping configurations for doped fiber amplifiers.

2. Description of the Prior Art

Lightwave transmission systems, in particular undersea and terrestrial loop distribution systems, are beginning to utilize doped fiber amplifier technology to replace the conventional electronic regenerators previously used to provide amplification of lightwave signals traveling long distances. There exists many arrangements in the art for providing such doped fiber amplification. One such arrangement is disclosed in U.S. Pat. No. 5,042,039 issued to Edagawa et al on Aug. 20, 1991. As described therein, an erbium-doped optical fiber is utilized to provide gain to a communication signal by simultaneously passing a "pumping" signal (at an appropriate wavelength) through the erbium-doped medium.

Various arrangements exist in the art for improving the efficiency of such doped fiber amplifiers. One arrangement, capable of providing gain equalization, is disclosed in U.S. Pat. No. 5,050,949 issued to DiGiovanni et al. on Sep. 24, 1991. In this particular arrangement, a multi-state optical fiber amplifier is provided, where each stage is pumped separately and the dopant composition of each erbium-doped fiber section is controlled to provide for gain equalization along the entire communication path. As disclosed an optical isolator is required between the stages to suppress reflection-induced noise.

A need in most lightwave transmission systems is to provide for back-up in case of the failure of a transmitting source. In the case of doped fiber amplifiers, the need often arises to provide a back-up pump laser source. Further, the choice of pump wavelength must often be chosen between a first value of approximately 1.48 $\mu$m, which provides maximum gain or 0.98 $\mu$m, which provides for low noise. Additionally, many systems exist which require a pump power level greater than that available from a single source. Current arrangements for providing increased pump power may utilize a pair of pump sources and require polarization control of the pump signals such that a polarization combiner may be utilized to launch pump pump signals into the doped fiber section. These and other issues remain of current concern in the doped fiber amplifier technology.

SUMMARY OF THE INVENTION

The concerns mentioned above are addressed by the present invention which relates to doped fiber amplifiers for utilization in lightwave transmission systems and, more particularly, to pumping configurations for such doped fiber amplifiers.

In accordance with an exemplary embodiment of the present invention, coupling means (for example, a pair of wavelength division multiplexers) are utilized to couple a lightwave message signal to be amplified and a pair of pump signals at different wavelengths (for example, but not limited to, 1.48 $\mu$m and 0.98 $\mu$m) into a common signal path and applied simultaneously as inputs to a rare-earth doped fiber section. A first multiplexer is utilized to couple a first pump signal $P_1$ at the longer wavelength $\lambda_{P1}$ (e.g., $\lambda_{P1} = 1.48$ $\mu$m) and the message signal S onto a common signal path. A second multiplexer is utilized to couple a second pump signal $P_2$ at the shorter wavelength $\lambda_{P2}$ (e.g., $\lambda_{P2} = 0.98$ $\mu$m) with the previously combined pump signal $P_1$ and message signal S. The output from the second multiplexer is subsequently applied as the input to the rare-earth doped fiber section, where the presence of the pump signals in the doped (e.g., erbium) medium results in amplification of the message signal. An isolator may be used at the output of the fiber amplifier to remove any unwanted pump signal from the amplified message signal $S_A$.

In an alternative embodiment of the present invention, a third pump signal $P_3$, operating at a third wavelength $\lambda_{P3}$ (for example, but not limited to, $\lambda_{P3} = 0.80$ $\mu$m) may be further combined with the signals defined above by adding another multiplexer to the arrangement. In general, any suitable number of pump signals, each operating at a different wavelength, may thus be incorporated by utilizing the requisite number of multiplexers.

As is known in the doped fiber amplifier art, the amount of amplification generated is a function of the physical length of the doped fiber section, the wavelength of the pump signal, and the pump power, where a fiber which is too short will limit the amplification and a fiber which is too long will add some attenuation prior to reaching the output. In particular, for linear amplification, there will be degradation of the noise figure. In the saturation regime, the optimum conversion of efficiency of the pump will be compromised. Since the various embodiments of the present invention utilize pump signals with different wavelengths, some compromise on fiber length is required to maximize the efficiency of the inventive hybrid arrangement. For one embodiment of the present invention, the doped fiber section may be divided into two lengths, $l_1$ and $l_2$, with the length of one component determined to maximize the efficiency of the pump signal with the shorter wavelength, and the length of the remaining component determined such that the total length, $l_1 + l_2$, is maximized for the longer wavelength pump signal. In this particular arrangement, therefore, the second multiplexer is interposed between the two fiber sections.

It is an advantage of the hybrid pumping scheme of the present invention that the advantages associated with pumping at relatively long wavelengths (i.e., maximum power) and relatively short wavelengths (i.e., low noise) may both be achieved without appreciable sacrifice.

Another advantage of the hybrid pumping scheme of the present invention is the provision of multiple pump sources associated with a doped fiber section such that if a particular pump source fails, amplification will still occur based upon the remaining active pump sources.

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

The present invention, in general, is related to the application of multiple pump sources, at different wavelengths, to a doped fiber amplifier. The following discussions of particular pumping wavelengths and particular fiber dopants are meant to be exemplary only, and for the purposes of discussion, not limitation, since any suitable combination of pump wavelength and fiber dopant material may be utilized to provide optical amplification in the disclosed hybrid arrangement.

Figure 1:
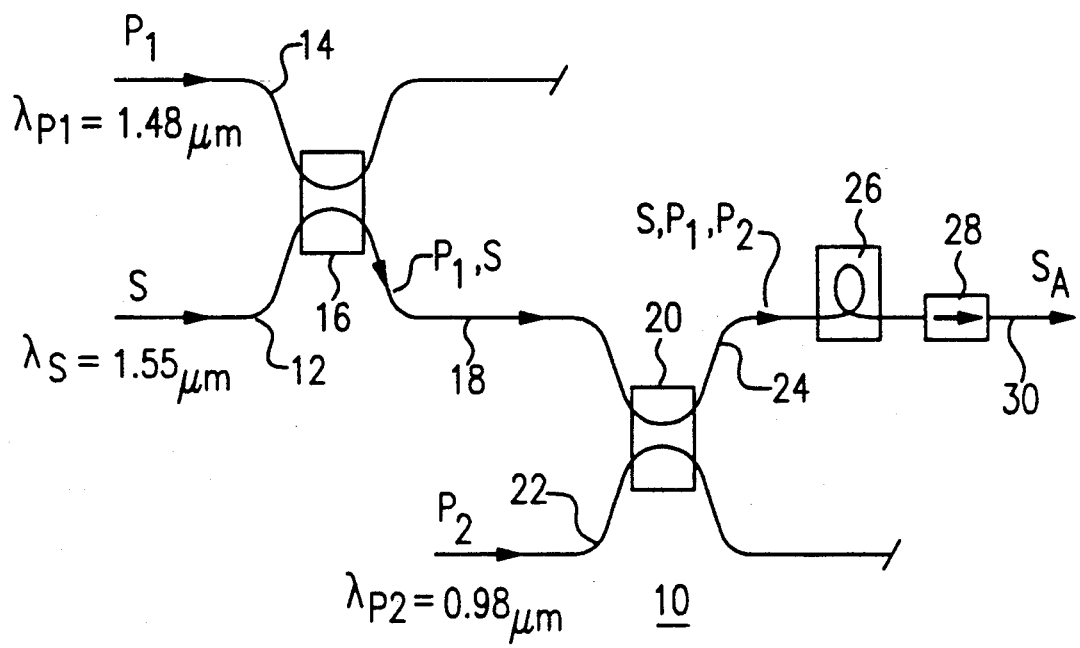
FIG. 1 illustrates an exemplary hybrid doped fiber amplifier formed in accordance with the present invention, utilizing a pair of pump sources.

FIG. 1 illustrates an exemplary hybrid fiber amplifier 10 formed in accordance with the teachings of the present invention. As shown, a message signal S to be amplified is coupled to a first input signal path 12 and a first pump signal $P_1$ is coupled to a second input signal path 14, where inputs 12 and 14 are provided as inputs to a first multiplexer 16. For the particular arrangement as illustrated in FIG. 1, message signal S is presumed to be at a wavelength $\lambda_S$ of 1.55 $\mu$m and first pump signal $P_1$ is presumed to be at a wavelength $\lambda_{P1}$ of 1.48 $\mu$m. First multiplexer 16 may comprise a conventional fused fiber coupler, a bulk (i.e., $LiNbO_3$-based) device, or any other suitable arrangement, and is utilized to couple both signals onto a common output signal path 18, as illustrated in FIG. 1. For the particular arrangement shown, message signal S will remain on the "straight through" path within first multiplexer 16 and should therefore experience negligible loss. The combination of first pump signal $P_1$ and message signal S appearing on signal path 18 at the output of first multiplexer 16 is then subsequently applied as an input to second multiplexer 20. The remaining input to second multiplexer 20 is a second pump signal $P_2$, operating at a second wavelength $\lambda_{P2}$, where for the particular embodiment of arrangement 10, $\lambda_{P2} = 0.98$ $\mu$m. In operation, second multiplexer 20 functions to couple second pump signal $P_2$ onto the common signal path with first pump signal $P_1$ and message signal S. The combination of all three signals is then coupled to output signal path 24 from second multiplexer 20 and subsequently applied as the input to doped fiber amplifier 26. As is well-known in the art, the presence of optical signals at wavelengths of $\lambda_{P1}$ and $\lambda_{P2}$ with message signal S within a rare-earth doped fiber (such as an erbium-doped fiber) will result in the amplification of message signal S, denoted $S_A$, appearing at the output of doped fiber amplifier 26. An optical isolator 28 may be disposed along output signal path 30 and used to remove any counter-propagating signals from entering doped fiber amplifier 26. It is to be understood that arrangement 10 of FIG. 1 may be modified to utilize a pair of counter-propagating pumps, disposed after doped fiber section 26 and coupled to section 26 in a manner similar to that described above. Alternatively, an arrangement may utilize both co- and counter-propagating pumps. One such arrangement will be described in detail below in association with FIG. 4.

Figure 2:
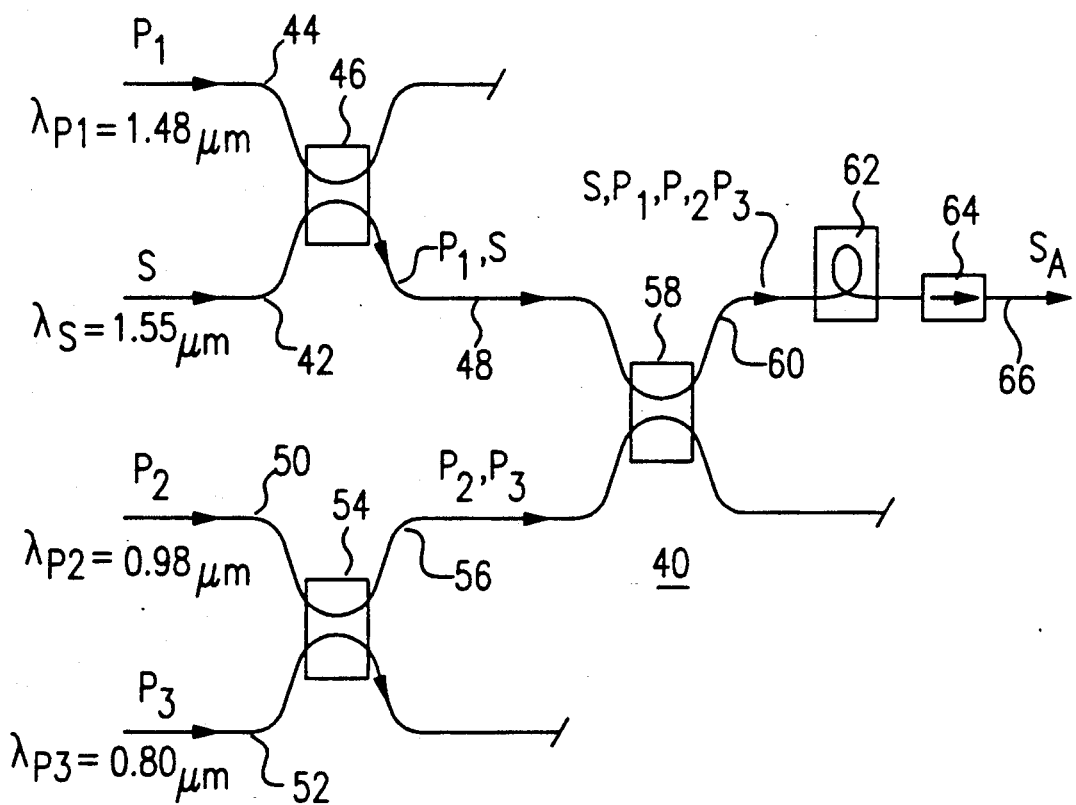
FIG. 2 illustrates an alternative embodiment of the present invention, utilizing a set of three separate pump sources.

As mentioned above, the hybrid pumping scheme of the present invention may utilize more than two pump sources. FIG. 2 illustrates a hybrid pumping arrangement 40 utilizing a set of three separate pump sources. Similar to arrangement 10 described above, a message signal S at a predetermined wavelength $\lambda_S$ and first pump signal $P_1$ at a predetermined wavelength $\lambda_{P1}$ are coupled into a pair of optical signal paths 42 and 44, respectively, and applied as inputs to a first multiplexer 46. The combination of message signal S and first pump signal $P_1$ are coupled by first multiplexer 46 onto a common optical signal path 48, as shown. A second pump source $P_2$ (at a wavelength $\lambda_{P2}$) and a third pump source $P_3$ (at a wavelength $\lambda_{P3}$) are likewise coupled onto optical signal paths 50 and 52, respectively, and applied as separate inputs to a second multiplexer 54. The combination of the second and third pump signals $P_2$, $P_3$ is subsequently coupled by second multiplexer 54 onto a common output signal path 56, as shown. A third multiplexer 58, coupled to receive as inputs optical signals paths 48 and 56, thus functions to combine all four signals (S, $P_1$, $P_2$ and $P_3$) onto a common optical signal path 60, where signal path 60 is subsequently applied as the input to a doped fiber amplifier 62. As before, the presence of the multiple pump signals within the doped fiber section results in amplification of the message signal, thus producing amplified message signal $S_A$ as the output of doped fiber amplifier 62 along output optical signal path 66. As with arrangement 10 of FIG. 1, an optical isolator 64 may be used to block any return signals from entering doped fiber amplifier 62.

It is well-known in the art that the maximum output power from a doped fiber amplifier is a function of the dopant material, dopant concentration, length of doped fiber section, the pump laser wavelength, and pump power. Utilizing erbiumdoped fiber of a commercially available concentration (i.e., 200–500 ppm), the maximum output power reduces to a function of fiber length, pump wavelength and pump power. Through experimentation, it has been determined that utilizing a pump signal at a wavelength of 1.48 $\mu$m (with a message signal at 1.55 $\mu$m), the output power is maximized for a fiber length of approximately 15 meters. A pump signal at a wavelength of 0.98 $\mu$m has been determined to provide a maximum output power utilizing a relatively shorter doped fiber length, on the order of approximately 9 meters. Thus, when coupling pumps of different wavelengths to the same doped fiber section, the maximum performance of each pump cannot be simultaneously achieved. For example, if the doped fiber section is of a length greater than the optimum for the shorter wavelength, attenuation of the message signal (as a function of pumping at the shorter wavelength) will occur. Alternatively, if the doped fiber section is of a length less than the optimum for the longer wavelength, complete amplification of the message signal cannot be optimally achieved.

Figure 3:
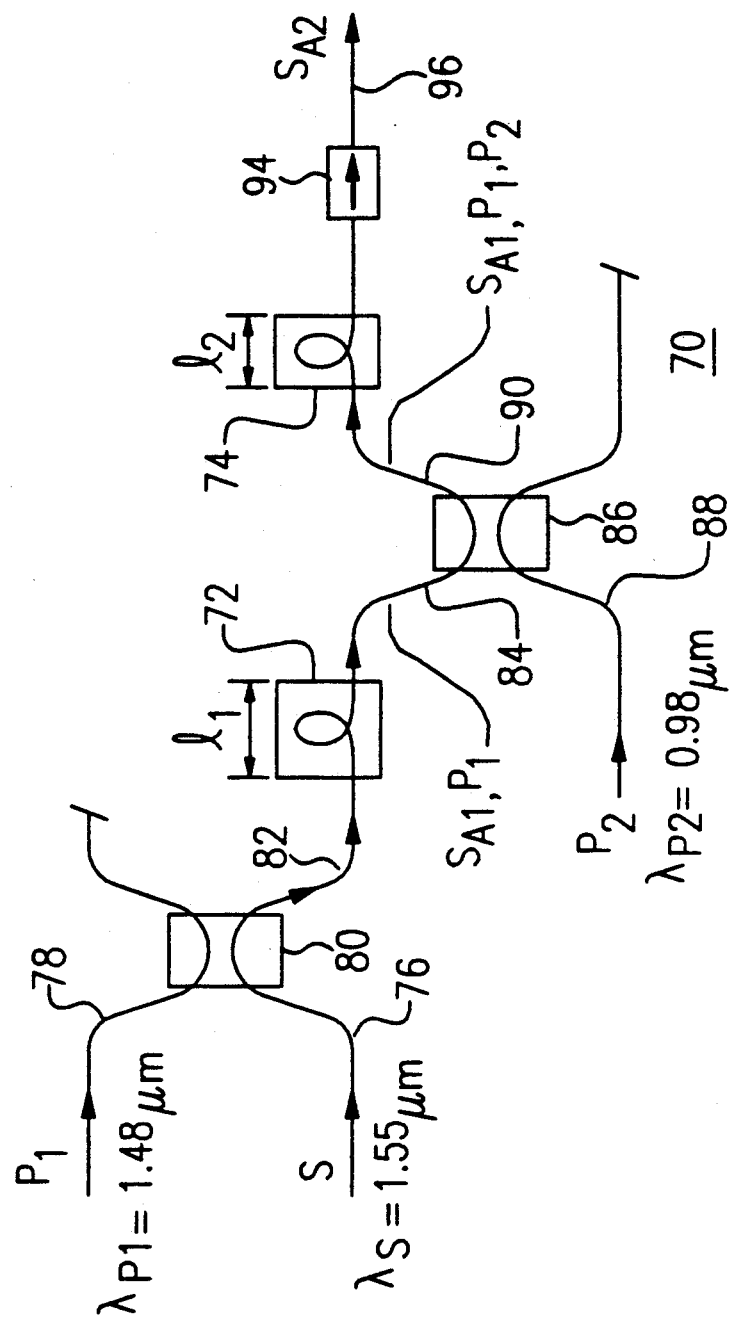
FIG. 3 illustrates yet another embodiment of the present invention where the length of the doped amplifier section is adjusted in accordance with the pump wavelength.

The arrangement of the present invention as illustrated in FIG. 3 provides a solution to this problem. As shown, hybrid pumping arrangement 70 is configured to utilize a pair of separate doped fiber sections 72 and 74, where as discussed in detail below, the length of each section is selected to optimize the performance of the associated pump source. Referring to FIG. 3, message signal S and first pump signal $P_1$ propagate along optical signal paths 76 and 78, respectively, and are applied as inputs to a first multiplexer 80. For the configuration of hybrid arrangement 70, pump signal $P_1$ must be associated with the longer wavelength pump source ($\lambda_{P1}$). Message signal S and first pump signal $P_1$ are thus combined within multiplexer 80 and appear along a common output signal path 82, as shown in FIG. 3. The combination of signals along path 82 are subsequently applied as an input to first doped fiber section 72, which is formed to comprise a predetermined length $l_1$. As will become apparent, length $l_1$ is chosen to be less than the optimum length for amplification at wavelength $\lambda_{P1}$, however, a significant amount of amplification will occur and the output from first doped fiber section 72 will be an amplified message signal $S_{A1}$. Since first pump signal $P_1$ is not completely exhausted by the amplification within first doped fiber section 72, a portion of $P_1$ will appear at the output thereof. Signals $A_1$ and $P_1$ are subsequently coupled into optical signal path 84 and applied as a first input to a second multiplexer 86. The remaining input to second multiplexer 86 is a second pump signal $P_2$, operating at a wavelength $\lambda_{P2}$ which is less than $\lambda_{P1}$. Pump signal $P_2$ is coupled into a signal path 88 and applied as an input to second multiplexer 86, as shown in FIG. 3. The output from second multiplexer 86, appearing along optical signal path 90, is thus a combination of amplified message signal $S_{A1}$, first pump signal $P_1$ and second pump signal $P_2$. Optical signal path 90 is subsequently coupled to the input of second doped fiber section 74. Second doped fiber section 74 is configured to comprise a length $l_2$ associated with the optimum performance (i.e., maximum amplification) at wavelength $\lambda_{P2}$. For example, assuming $\lambda_2 = 0.98$ μm (and $\lambda_S = 1.55$ μm), length $l_2$ may be approximately 9 meters (for a conventional erbium-doped fiber). The length $l_1$ of first fiber section 72 is then chosen such that the total length $l_1 + l_2$ is approximately the optimum length for amplification at wavelength $\lambda_{P1}$. Therefore, assuming $\lambda_{P1}$ is $= 1.48$ μm and the optimum doped fiber length for this wavelength is approximately 15 meters, the length $l_1$ is chosen to be approximately 6 meters. With this particular configuration therefore, amplification associated with first pump signal $P_1$ will occur within both doped fiber sections 72 and 74, thus optimizing the overall performance of hybrid pumping arrangement 70. The output from second doped fiber section 74 will thus be the amplified message signal $S_{A2}$, as amplified by both pump signal $P_1$ and pump signal $P_2$. As with the other arrangements discussed above, an optical isolator 92 may be disposed at the output of doped fiber section 74 to prevent reflected signals from entering arrangement 70.

Figure 4:
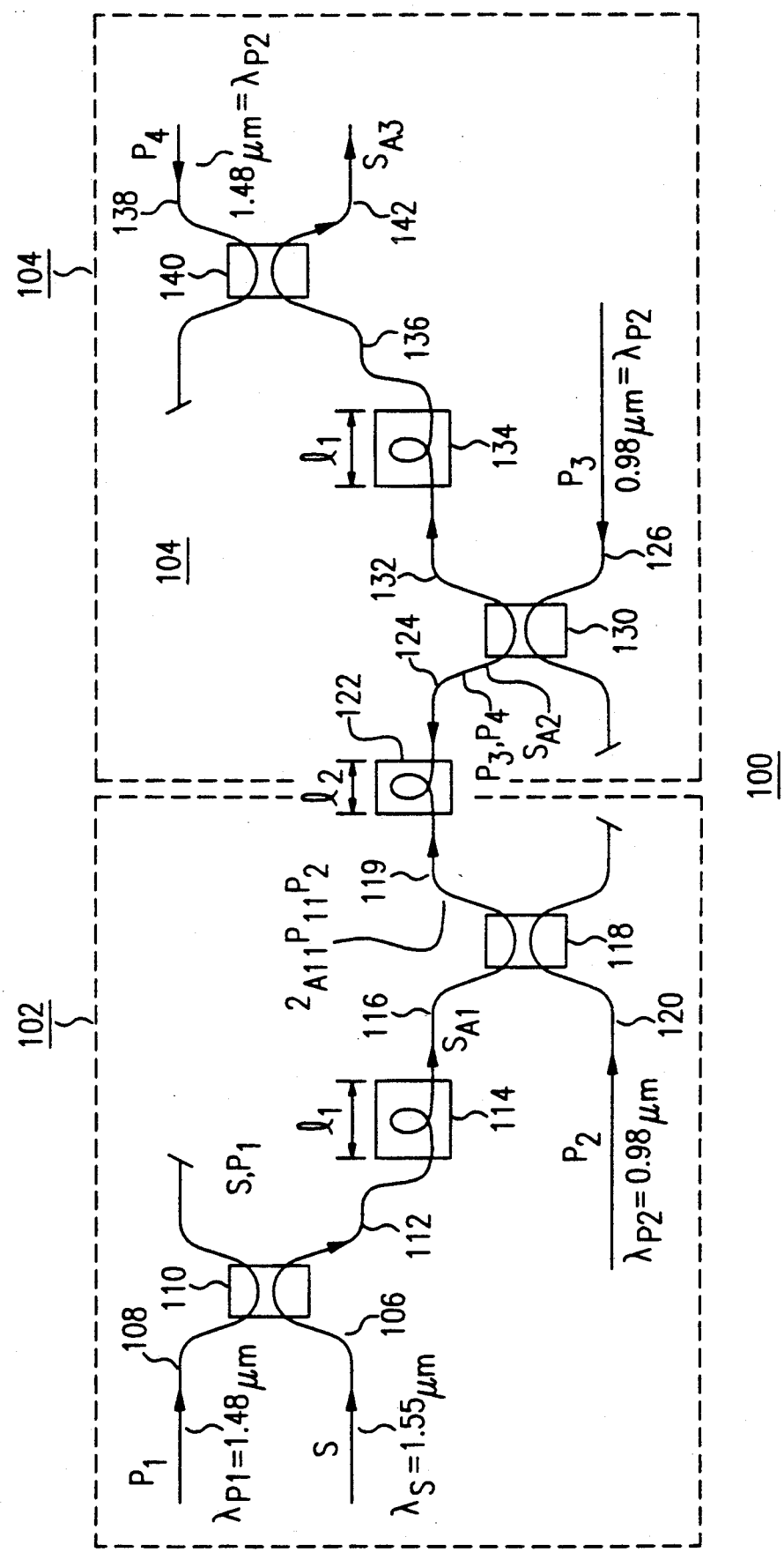
FIG. 4 illustrates a further embodiment of the present invention, including a pair of cascaded doped fiber amplifiers which utilize both co-propagating and counter-propagating pump sources.

A cascaded hybrid pumping arrangement 100, utilizing the fiber separation technique described above, is illustrated in FIG. 4. As indicated, cascaded arrangement 100 comprises a pair of amplifiers 102 and 104, where the output from first amplifier 102 is utilized as the input to second amplifier 104. In particular, a message signal S and first pump signal $P_1$ are coupled onto separate optical signal paths 106 and 108, respectively and applied as separate inputs to an optical multiplexer 110. As with the arrangement of FIG. 3, the operating wavelength $\lambda_{P1}$ of first pump signal $P_1$ must be the longer of the pump wavelengths utilized in the arrangement. The output from multiplexer 110, appearing along optical signal path 112, will thus be a combination of message signal S and first pump signal $P_1$. Optical signal path 112 is subsequently coupled to the input of a first doped fiber section 114, where doped fiber section 114 comprises a length $l_1$ somewhat less than the optimal length for amplification at wavelength $\lambda_{P1}$, as described above in association with FIG. 3. For example, assuming $\lambda_{P1}$ is 1.48 μm, $l_1$ may be approximately 6 meters. Amplification within this length of fiber will occur, providing as an output along signal path 116 an amplified message signal $S_{A1}$ and first pump signal $P_1$. This combination of signals along path 116 is subsequently applied as a first input to a second multiplexer 118, where the remaining input to second multiplexer 118 is a second pump signal $P_2$, operating at a wavelength $\lambda_{P2}$, where $\lambda_2$ is less than $\lambda_{P1}$. Second pump signal $P_2$ propagating along optical signal path 120 is then combined with the message signal and first pump signal within second multiplexer 118 to provide as the output from second multiplexer 188, along optical signal path 119, the combination of all three signals, as illustrated in FIG. 4. Optical signal path 119 is subsequently utilized as the input to a second doped fiber section 122, where second doped fiber section 122 comprises a length $l_2$ determined to provide optimal amplification at second wavelength $\lambda_{P2}$. For example, assuming $\lambda_{P2} = 0.98$ μm, $l_2$ will be approximately 9 meters. The output from second doped fiber section appearing along optical signal path 124 will thus be the amplified message signal $S_{A2}$, where this signal is defined as the output from first fiber amplifier 102.

As is well-known in the fiber amplifier art, the amplification action within the doped fiber section is independent of the propagation direction of the pump signal. That is, the pump signal may travel in the same direction as the message signal (co-propagating), or in the opposite direction (counter-propagating). Second fiber amplifier 104 illustrates an arrangement which utilizes counter-propagating pump signals. As a result of the counter-propagating scheme, the same second doped fiber section 122 can be used with a third pump signal $P_3$, operating at wavelength $\lambda_{P2}$, and traveling in a counter-propagating direction with respect to message signal S. Referring to FIG. 4, third pump signal $P_3$ is coupled to an optical signal path 126 and provided as an input to a third multiplexer 130. Third multiplexer 130 is also coupled to output signal path 124 from second doped fiber section 122, in the manner shown in FIG. 4. In particular, third multiplexer 130 is utilized to couple third pump signal $P_3$ onto optical signal path 124 and, as a result of the propagation direction of third pump signal $P_3$, apply signal $P_3$ as an input to second doped fiber section 122. The existence of third pump signal $P_3$ within second doped fiber section 122 simultaneously with message singal $S_{A1}$ thus provides further amplification of the message signal, defined as $S_{A2}$ at the output of second doped fiber section 122.

Amplified message signal $S_{A2}$, as shown in FIG. 4, subsequently passes through third multiplexer 130 relatively unimpeded and is coupled onto optical signal path 132 and applied as an input to a third doped fiber section 134, where third doped fiber section 134 is formed to comprise the length $l_1$ as defined above. A fourth pump signal $P_4$, operating at the first wavelength $\lambda_{P1}$ is provided as an input, via a fourth multiplexer 136 and optical signal path 138, to third doped fiber section 134, where fourth pump signal $P_4$ is also a counter-propagating pump. As discussed above in association with the arrangement of FIG. 3, fourth pump signal $P_4$ will propagate through both third doped fiber section 134 and second doped fiber section 122 and provide amplification of message signal $S_{A1}$ within both sections, since the combination of $l_1+l_2$ is approximately the optimal length for amplification at first wavelength $\lambda_{P1}$.

The amplified message signal $S_{A3}$ appearing along optical signal path 138 at the output of third doped fiber section 134 is thus defined as the final amplified message signal, having received amplification from all four pump sources $P_1$ through $P_4$. Final amplified message signal $S_{A3}$ subsequently passes through fourth multiplexer 136 relatively unimpeded and is coupled onto optical signal path 142 and appears as the output amplified message signal $S_A$ from hybrid pumping arrangement 100.

It is to be noted that various other combinations of co- and counter-propagating pump sources may be utilized in accordance with the teachings of the present invention to provide a hybrid pumping scheme. Further, combinations of any appropriate pumping wavelengths and fiber sections may be used in order to achieve the desired level of amplification. The particular embodiments as described above are presented as illustrative only, by way of example and not limitation with respect to the scope of the present invention.

I claim:

1. An optical system for amplifying an optical message signal (S) at a predetermined message wavelength ($\lambda_s$), said system comprising
    a rare-earth doped optical fiber section;
    a plurality of optical pump sources (P) operating at at least two different wavelengths (e.g., $\lambda_{P1}, \lambda_{P2}$), said pump sources capable of providing amplification of said message signal within said doped fiber section; and
    means for coupling said optical message signal and said plurality of optical pump sources to said doped fiber section.

2. An optical system as defined in claim 1 wherein
    the plurality of optical pump sources comprises a pair of pump sources, defined as a first pump source operating at a first pump wavelength $\lambda_{P1}$ and a second pump source operating at a second pump wavelength $\lambda_{P2}$; and
    the coupling means comprises
    a first optical multiplexer for receiving as separate inputs the optical message signal and the first pump source and providing as an output both input signals on a common output signal path; and
    a second optical multiplexer for receiving as separate inputs the common output signal path from the first optical multiplexer and the second pump source and providing as an output said message signal, said first pump source and said second pump source on a common output signal path, the output signal path from the second multiplexer coupled to the input of the doped fiber section.

3. An optical system as defined in claim 2 wherein the first pump source operates at a wavelength of approximately 1.48 $\mu$m and the second pump source operates as a wavelength of approximately 0.98 $\mu$m.

4. An optical system as defined in claim 2 wherein the first and second optical multiplexers comprise first and second fused fiber couplers.

5. An optical system as defined in claim 1 wherein
    the plurality of pump sources comprises a first pump source operating at a first pump wavelength $\lambda_{P1}$, a second pump source operating at a second pump wavelength $\lambda_{P2}$ and a third pump source operating at a third pump wavelength $\lambda_{P3}$; and
    the coupling means comprises
    a first optical multiplexer for receiving as separate inputs the optical message signal and the first pump source and providing on a first common output signal path both said message signal and first pump source;
    a second optical multiplexer for receiving as separate inputs the second pump source and the third pump source and providing on a second common output signal path both said second and third pump sources; and
    a third optical multiplexer for receiving as separate inputs the first common output signal path from the first multiplexer and the second common output signal path from the second multiplexer for providing on a third common output signal path the combination of the message signal, first pump source, second pump source and third pump source, the third common output signal path coupled to the input of the doped fiber section.

6. An optical system as defined in claim 5 wherein $\lambda_{P1}$ is approximately 1.48 $\mu$m, $\lambda_{P2}$ is approximately 0.98 $\mu$m, and $\lambda_{P3}$ is approximately 0.80 $\mu$m.

7. An optical system as defined in claim 5 wherein the first, second and third multiplexers comprise fused fiber couplers.

8. An optical system as defined in claim 1 wherein the length of the doped fiber section comprises a plurality of sections, the length of each section determined in accordance with the pump wavelengths of the plurality of pump sources.

9. An optical system as defined in claim 8 wherein
    the plurality of pump sources comprises a pair of pump sources, the wavelength associated with a first pump source being longer than the wavelength associated with a second pump source; and
    the doped fiber section comprises a first component of length $l_1$ and a second component of length $l_2$, the length of said second component determined to provide maximum amplification with the second pump source and and the length of said first component determined such that the sum $l_1$ and $l_2$ provides maximum amplification with the first pump source.

10. An optical system as defined in claim 9 wherein the wavelength of the first source is approximately 1.48 $\mu$m and the wavelength of the second source is approximately 0.98 $\mu$m.

11. An optical system as defined in claim 10 wherein the length of the first component is approximately 6 meters and the length of the second component is approximately 9 meters.

* * * * *